3,600,289
TREATMENT OF RESIN SURFACES TO IMPROVE ADHESIVE BONDING, RESIN BODIES WITH TREATED SURFACES AND ADHESIVE PROCESS
Robert A. Bragole, Peabody, Mass., assignor to USM Corporation, Flemington, N.J.
No Drawing. Continuation-in-part of abandoned application Ser. No. 664,648, Aug. 31, 1967. This application Apr. 21, 1969, Ser. No. 818,045
Int. Cl. C08d 1/00; C08f 1/16
U.S. Cl. 204—159.14
16 Claims

ABSTRACT OF THE DISCLOSURE

Surfaces of substrates having a low surface tension of wetting, e.g. polyethylene are subjected to ultraviolet radiation and then treated with polyisocyanate. The polyisocyanate interacts with the radiated material to create a surface character readily and strongly bonded by adhesives.

FIELD OF THE INVENTION

This invention relates to adhesive processes and particularly processes for improving the adhesive character of low energy polymeric resin bodies and to such resin bodies having improved adhesive surface character.

BACKGROUND OF THE INVENTION

This application is a continuation-in-part of my copending application Ser. No. 664,648, filed Aug. 31, 1967, now abandoned entitled "Treatment of Resin Surfaces To Improve Adhesive Bonding, Resin Bodies With Treated Surfaces and Adhesive Process."

Polyalkylene plastic materials, particularly polyethylene and polypropylene possess many desirable characteristics including inertness to most chemicals and solvents at ordinary temperatures, resistance to electricity, toughness and flexibility. By reason of these and other properties it has been desired to employ such materials in numerous relationships where the bonding of the material to itself or to other surfaces is required.

These materials present a waxy, sometimes paraffinlike surface character, i.e. have a low critical surface tension of wetting, which interferes with adhesion by the commonly employed adhesive or coating agents. In many relationships, for example, in the use of flexible polyethylene sheet material or the lamination of polyethylene to flexible sheet materials, hot melt adhesives which operate to fuse and integrate with the polyethylene surface may be used to bond the surface. However, there are many relationships where because of the rigidity of the materials to be combined or because of special contours or other factors such hot melt adhesive systems are not usable.

SUMMARY OF THE INVENTION

It is an object of the present invention to alter the surface character of these low surface tension of wetting materials to a state in which they are readily bonded by adhesives.

It is a further object to provide a simple practical process for adhesively bonding surfaces of low surface energy substrates using solution type adhesives.

It is a still further object of the invention to provide an article having a main body portion composed of low surface tension of wetting polymer resin material and an adhesive bondable surface integral with the main body of material.

To these ends and in accordance with a feature of the present invention, a body of low surface tension of wetting polymer resin material is subjected to ultraviolet radiation to an extent sufficient to produce a reactive surface which may include hydroxyl and unsaturated groups on its surface and is then treated with a polyisocyanate which combines with the hydroxyl groups formed by radiation to form an integral surface on the resin body capable of bonding by adhesives. Adhesive is applied to the surface and, with the adhesive in active condition, the body is assembled against the surface of a second body to which it is to be joined.

PREFERRED EMBODIMENTS

Materials which are treated according to the process of the present invention are low surface tension of wetting substrates which because of this characteristic are difficult to wet and bond with adhesives. Materials considered as having a low surface energy are those of which the critical surface tension of wetting is 35 dynes per centimeter or less as determined by contact angle measurements. (See page 20 of "Contact Angle, Wettability and Adhesives," No. 43 of the "Advances in Chemistry Series," published 1964 by the American Chemical Society.) Included in the category are polyethylene, polypropylene, copolymers of ethylene and propylene alone or with a very low percentage of a non-conjugated diene, e.g. the commercial terpolymer EPDM comprising about 64% ethylene, about 34% propylene and about 2% 1,4-hexadiene, and fluorine-containing polymers such as polyvinyl fluoride and polyvinylidene fluoride. Polymers for treatment by the present process must have at least some hydrogen on a carbon chain in a repeating unit in the polymer chain.

The first step in the process is the treatment of the surface of the material by ultraviolet radiation. The ultraviolet radiation bombards the surface of the plastic with photons which excite the molecules and causes chemical and electronic changes in the surface molecules. It has been found that ultraviolet radiation at a wave length of from 2000 to 3500 A. for 100 watt seconds per square foot and preferably from about 1000 to about 6000 watt seconds per square foot induce a change in the surface such that on treatment with polyisocyanate an adhesively bondable surface is obtained.

It is also found that the presence of an ultraviolet radiation photosensitizer at the surface increases the effectiveness of the ultraviolet radiation so that shorter radiation periods may be used. Such ultraviolet radiation sensitizers may be halogenated hydrocarbons such as methylene chloride, trichloroethylene, and chloroform, ketone materials such as benzophenone, acetophenone, benzoin, 2-acetonaphthone or other known photosensitizers such as acenaphthene and fluorene. In general, these materials are excited by ultraviolet radiation and, in excited state, interact with the resin substrate to initiate reactions producing groups which will react with isocyanates. It appears to be important that the photosensitizer have a triplet state energy of at least about 62 kcal./mole. Sensitizers in which carbon atoms are linked to other atoms by multiple bonds as in benzophenone and trichloroethylene are believed to be engrafted into the molecular chain of the resin substrate and may themselves provide groups which will react with isocyanate.

The photosensitizer is generally applied to the surface of the material in the form of a solution in a volatile solvent in the case of solid photosensitizers or as a pure or diluted liquid in the case of liquid photosensitizers. As little as 2% by weight of photosensitizer in the solution applied may be effective; but higher percentages may be used without adverse results. The important factor is presence of the photosensitizer at the surface during ultraviolet radiation and this may be secured by melting and spraying fusible solid photosensitizer on the surface or by other procedures such as dusting on a powder of the photosensitizer. It has even been found that photosensitizers, preferably solid photosensitizers of the ketone type, may be uniformly distributed through the material to be bonded as by milling the photosensitizer into the material. Apparently sufficient of the photosensitizer reaches the surface by migration or otherwise to provide sensitizing action. To be effective in this relation there should be used at least about 0.1% by weight of the photosensitizer based on the total weight of the compound. It has been observed with solid photosensitizers that their effectiveness is increased where heat sufficient to fuse the photosensitizer is applied. This may be the heat generated in the course of ultraviolet radiation. Because of this factor it is desirable to use lower melting point photosensitizers to facilitate wetting of the substrate by the photosensitizer. Of course, mixtures of photosensitizers including, for example, high and low melting point photosensitizers or components which reduce the melting point of the photosensitizer may be used.

Where the surface being treated is an elastomeric material, fusion of the photosensitizer appears to cause the photosensitizer to penetrate into the body of material, and thus avoid presence of excess photosensitizer at the surface which might constitute a weak boundary layer.

Such penetration may not occur with the resinous plastic type of material and it has been found desirable in many cases to wipe the surface after radiation, preferably with a solvent for the photosensitizer to avoid possible weak boundary layers from the presence of residual photosensitizer. This wiping may be a separate step, or, for example, where the isocyanate is applied by wiping or excess isocyanate on the surface is wiped off, this wiping step may be used to remove undesired residual photosensitizer.

The next step is treatment of the ultraviolet radiated surface with an organic isocyanate. Polyisocyanates are preferred over monoisocyanates, and polyisocyanates having an —NCO functionality of more than two such as triphenylmethane triisocyanate and polyarylene polyisocyanate (—NCO functionality of 2.8) have been found superior to the diisocyanates. These materials may be applied in organic solvent solution. No special conditions of temperature or time are necessary for the contact and it has been found that the desired results are obtained by merely spreading a solution over the ultraviolet radiated surface and wiping off the excess, the whole treatment being carried out at room temperature. Any convenient solvent may be used for the isocyanate. In general it is preferred to use volatile solvents which evaporate rapidly. Useful solvents include methylene chloride, methyl ethyl ketone, and tetrahydrofurane; but other solvents may be used which do not interfere with the activity of the isocyanate. Solutions containing as little as 1% by weight of the isocyanate may be used, but it is preferred to use concentrations of at least 10% for greater effectiveness. It is believed that —NCO groups of the isocyanate react with hydroxyl groups formed on the surface of the material so that the surface of the material after treatment with the isocyanate is a polyurethane stratum integrally united with the main body of the low surface energy material.

It has been found that those adhesives which are useful for bonding polyurethanes, are effective to form strong bonds to the surface which has been radiated and treated with isocyanate. Among adhesives which have been found useful are a solution of a linear polyester glycol urethane, e.g. a solution of Estane in organic solvents. There have also been used a solution of a polyether glycol urethane and a solution of a resinous polyester obtained by condensation and polymerization of at least one dibasic organic acid with at least one glycol. Suitable dibasic acids include aromatic dibasic acids such as terephthalic acid, isophthalic acid, phenyl indane dicarboxylic acid, hexahydrophthalic acid anhydride and others, and aliphatic dibasic acids such as azelaic acid, suberic acid, sebacic acid and others. Useful glycols include 1,4 butane diol, 1,6 hexane diol, ethylene glycol and so on. The polyesters may be made by condensation of one or more than one dibasic acid and one or more than one glycol. Polyesters may also be made from polymerization of lactones such as $\epsilon$ caprolactone.

In a modification of the process, the isocyanate needed for reaction with the radiated surface may be incorporated in the adhesive or in a diluted solution of the adhesive. This modification may eliminate the separate step of treating with isocyanate, or may provide a coating readily bonded even after long standing by a further coating of adhesive. In such adhesive solution, the isocyanate should be present to the extent of at least about 1%.

Where solution type adhesives are used, adhesive bonding may involve applying the solution, evaporating the solvent and thereafter activating the deposited adhesive material either by a solvent or by heat.

The following examples are given to aid in understanding the invention; and it is to be understood that the invention is not restricted to the particular materials or treatment conditions given in the examples.

Example I

The following series of bonds was prepared in which strips of ethylene-propylene 1,4 hexadiene terpolymer, (EPDM), coated polyester fiber (Dacron) fabric were adhesively bonded, coated face to coated face. The surfaces of the coated faces were radiated with ultraviolet as indicated and then given an "—NCO wipe" i.e. brushing the surface with a solution of a diisocyanate or a polyisocyanate in volatile solvent in varying concentrations wiping off the excess and allowing the surface to dry as set forth in the accompanying table. The treated surfaces were then given an adhesive coating of a 15% solids solution in tetrahydrofurane of a linear polyurethane obtained by condensation of one mol of polyester glycol (Niax Polyol D-560) from polymerization of a lactone and having a molecular weight of about 2000, with 2 mols of methylene bis (4-phenyl isocyanate) and chain extension of the condensation product with 1,4 butane diol. The chain extension product has a glass transition temperature of —45° C. and the 15% solids solution has a Brookfield viscosity of about 2200 cps. In each case the adhesive was allowed to dry for three hours and was then activated by brushing with tetrahydrofurane and pressed against a similar adhesive coated surface. The adhesive bonds were tested after three days in a peel pull tester set to separate the strips at a rate of twelve inches per minute.

In those treatments involving radiation, this was accomplished by disposing the surface at a distance of five inches from a 1500 watt ultraviolet lamp (major wave length 2537 A.) for time periods calculated to give the listed dosage. The photosensitizer treatment involved brushing the exposed surface of the coating with a 32% solids solution of benzophenone in toluol and evaporating the solvent prior to subjecting the sample to ultraviolet radiation.

TABLE

| Radiation | —NCO wipe | Peel pull in lbs./inch width | Character of failure |
| --- | --- | --- | --- |
| No irradiation | 70% MDI [1] | 3 | Interfacial. |
| Do | 20% MDI | 1 | Do. |
| Do | 1% MDI | 0.5 | Do. |
| Do | 70% PAPI [2] | 5 | Do. |
| Do | 20% PAPI | 6.5 | Do. |
| Do | 1% PAPI | 1.5 | Do. |
| 100 watt seconds | 70% MDI | 3 | Do. |
| Do | 20% MDI | 1 | Do. |
| Do | 1% MDI | 1 | Do. |
| Do | 70% PAPI | 10 | Extensive delamination. |
| Do | 20% PAPI | 7.5 | Mostly interfacial. |
| Do | 1% PAPI | 2.5 | Do. |
| 1,000 watt seconds | 70% MDI | 6 | Interfacial. |
| Do | 20% MDI | 2 | Do. |
| Do | 1% MDI | 2 | Do. |
| Do | 70% PAPI | 14 | Extensive delamination. |
| Do | 20% PAPI | 10 | Some delamination. |
| Do | 1% PAPI | 4 | Interfacial. |
| Photosensitizer treated surface, 100 watt seconds | 70% MDI | 8 | Mostly interfacial. |
| Do | 20% MDI | 4 | Do. |
| Do | 1% MDI | 3 | Do. |
| Do | 70% PAPI | 15 | Complete delamination. |
| Do | 20% PAPI | 14 | Do. |
| Do | 1% PAPI | 4 | Mostly interfacial. |

[1] Solution of methylene bis(4 phenyl isocyanate) in tetrahydrofurane.
[2] Solution of polyarylene polyisocyanate, (—NCO equivalent 2.8) in tetrahydrofurane.

In the table under "Character of Failure" the term "Interfacial" means that the failure was a stripping of the adhesive from the ethylene propylene diene terpolymer at the interface. This is indicative of failure of the adhesive to establish a wetting adhesive engagement with the terpolymer surface. "Delamination" refers to actual tearing away of the terpolymer material from the fabric base and indicates that the union between the adhesive and the terpolymer material was excellent so that the adhesive bond was stronger than the union between the terpolymer and the fabric base.

The listed results show that the polyisocyanate wipe of the radiated surface is much more effective than the diisocyanate in establishing a surface character giving strong bonds with the applied adhesive. However, with the more strongly radiated surfaces, even the diisocyanate allows the establishment of bonds strong enough for some purposes. It is also to be noted that although a 1% solids solution of isocyanate produces observable results particularly with the more highly radiated surfaces, markedly superior results are obtained with the higher concentration isocyanate solutions.

Example II

The following series of bonds was prepared in which strips of polyvinyl fluoride resin film about 2 mils in thickness were bonded to form lap joints. The surfaces to be bonded of the film strips were given pretreatments as set forth in the accompanying table and were then given an adhesive coating of a 15% solids solution in tetrahydrofurane of a linear polyurethane obtained by condensation of one mol of poplyester glycol (Niax Polyol D-560) from polymerization of a lactone and having a molecular weight of about 2000 with 2 mols of methylene bis(4 phenyl isocyanate) and chain extension of the condensation product with 1,4 butane diol. In each case the adhesive was allowed to dry for three hours and was then activated by brushing with tetrahydrofurane and pressed against the similar adhesive coated surface. The adhesive bonds were tested after three days in a peel pull tester set to separate the strips at a rate of 12 inches per minute.

In those treatments involving radiation, this was accomplished by disposing the surface at a distance of five inches from a 1500 watt ultraviolet lamp (major wave length 2537 A.) The photosensitizer treatment involved brushing the exposed surface of the coating with a 32% solids solution of benzophenone in toluol and evaporating the solvent prior to subjecting the sample to ultraviolet radiation.

TABLE

| Radiation | —NCO wipe | Peel pull in lbs./in. width | Character of failure |
| --- | --- | --- | --- |
| No radiation | None | 1# | Interfacial. |
| 100 watt seconds | None | 1.5# | Do. |
| No radiation | PAPI [1] | 1# | Do. |
| No sensitizer: | | | |
| 100 watt seconds | PAPI | 2# | Cohesive. |
| 300 watt seconds | PAPI | 2# | Do. |
| 500 watt seconds | PAPI | 3# | Do. |
| 1,000 watt seconds | PAPI | 3# | Cohesive and material. |
| 2,000 watt seconds | PAPI | 4# | Material. |
| 3,000 watt seconds | PAPI | 4# | Do. |
| Sensitizer: | | | |
| 100 watt seconds | PAPI | 3# | Mostly cohesive. |
| 500 watt seconds | PAPI | 3# | Material. |
| 1,000 watt seconds | PAPI | 4.5# | Do. |

[1] 20% solids solution of polyarylene polyisocyanate (—NCO equivalent 2.8) in tetrahydrofurane.

In the table under "Character of Failure" the term "Interfacial" means that the failure was stripping of the adhesive from the ethylene propylene diene terpolymer at the interface. This is an indication that the adhesive failed to establish adequate wetting and adhesive engagement with the terpolymer material. The term "cohesive" refers to a failure within the adhesive and indicates that although some degree of wetting and adhesive engagement was established between the adhesive and the terpolymer material, the engagement was unsatisfactory. The term "material" indicates that the bond between the adhesive and the terpolymer material was so strong that the material itself, i.e. the polyvinyl fluoride film, failed under the stresses imposed in the peel pull test.

As shown in the table the combination of the radiation treatment with the isocyanate wipe is much more effective than either the isocyanate wipe alone or the radiation treatment alone. In fact, in this regard the isocyanate wipe without radiation gives no advantage over the surface which has not been wiped with isocyanate. In combination with the isocyanate wipe, it appears that the strength of bond increases with increasing radiation up to about 3000 watt seconds per square foot. The table also shows that the pretreatment of the surface with a photosensitizer reduces the radiation dosage required to obtain a given level of bond strength.

Example III

A polyethylene heel rise element was brushed with a 30% solution of benzophenone in toluol and dried. The coated surface was disposed 5" from a 1500 watt ultraviolet lamp (major wave length 2537 A.) and subjected to radiation for 45 seconds. The radiated surface of the heel rise was brushed with a 70% solution in methyl ethyl ketone of polyarylene polyisocaynate (PAPI) which has an overall isocyanate functionality of 2.8 —NCO groups per molecule and is understood to be a mixture of a diisocyanate, a triisocyanate and a small percentage of tetraisocyanate. The solution was wiped from the surface directly after being brushed on.

A surface of a rubber heel to be joined to the polyethylene heel rise element was also treated with the polyisocyanate solution and wiped. Thereafter, the surfaces of the polyethylene heel rise and of the rubber heel which were to be joined were coated with a 15% soilds by weight solution of a linear polyester glycol urethane (Estane) in tetrahydrofuran and the coatings were allowed to dry for about three hours. The surfaces were then activated by infrared heat for 30 seconds to bring the surface temperatures to about 165° F. and the heel and polyethylene rise element were assembled and pressed together. On cooling the bond was very strong and the heel and heel rise element were not separable without destruction.

Example IV

A polyethylene heel rise element was brushed with a 30% solution of benzophenone in toluol and dried. The coated surface was disposed 5 inches from a 1500 watt ultraviolet lamp (major wavelength 2537 A.) and subjected to radiation for 45 seconds. The radiated surface of the heel rise was coated with an adhesive solution comprising a mixture of 10 parts by volume of a 15% by weight solution in tetrahydrofuran of a linear polyurethane obtained by condensation of one mol of a polyester (Niax Polyol D–560), molecular weight about 2000 from polymerization of a lactone, with 2 mols of methylene bis(4-phenyl isocyanate), and chain extension of the condensation product with 1,4-butane diol into which solution there were incorporated 2 parts by volume of a 20% by weight solution in methylene chloride of triphenylmethane triisocyanate. The coated surface was allowed to dry for three hours.

A surface of a rubber heel to be joined to the polyethylene heel rise element was treated with a 70% solution in methyl ethyl ketone of polyarylene polyisocyanate (PAPI). The solution was wiped from the surface directly after being brushed on. Thereafter the surfaces of the polyethylene heel rise and the rubber heel which were to be joined were coated with a 15% solution of the above linear polyurethane in tetrahydrofuran and the coatings were allowed to dry for 3 hours. The surfaces were then activated by infrared heat for 30 seconds to bring the surface temperature to about 165° F. and the heel and polyethylene rise element were assembled and pressed together. On cooling the bond was very strong and the heel and heel rise element were not separable without destruction.

Example V

Dacron fabric coated with terpolymer (EPDM) of about 64% ethylene, about 34% propylene and about 2% of 1,4-hexadiene was subjected to radiation for 10 seconds at a distance of 5" from a 1500 watt ultraviolet lamp (major wavelength 2537 A.). This corresponds to a radiation of 1000 watt seconds per square foot. After radiation the surface of the radiated coating was brushed with a 70% solids solution of polyarylene polyisocyanate (PAPI) in methyl ethyl ketone, the excess was wiped off and the solution allowed to dry.

The polyisocyanate treated surface was then coated with an adhesive solution comprising 25% solids in tetrahydrofuran of a copolyester obtained by condensation of 27 parts by weight of terephthalic acid, 6.6 parts by weight of hexahydrophthalic anhydride and 17.65 parts by weight of sebacic acid with 15.7 parts by weight of cyclohexanedimethanol and 26.1 parts by weight of 1,4-butane diol, the copolyester having a melting point of 120° to 130° C. The adhesive coating was allowed to dry. Thereafter, the adhesive coating was brushed with tetrahydrofurane and surfaces of two portions of the coated fabric were pressed together. In a peel pull test at 12" per minute, a bond strength of 12 lbs. per inch of width was obtained.

Example VI

Dacron fabric coated with ethylene propylene diene terpolymer (EPDM) was subjected to radiation for one second at a distance of 5" from a 1500 watt ultraviolet lamp. This corresponds to a radiation of about 100 watt seconds per square foot. After radiation the surface of the radiated coating was brushed with a 20% solids solution of triphenyl methane triisocyanate in methylene chloride. The excess was wiped off and the solution was allowed to dry.

The polyisocyanate treated surface was then coated with an adhesive solution comprising 15% by weight in tetrahydrofuran of a linear polyurethane obtained by condensation of one mol of a polyester (Niax Polyol D–560) (molecular weight about 2000) from polymerization of a lactone, with 2 mols of methylene bis(4-phenyl isocyanate), and chain extension of the condensation product with 1,4-butane diol. The adhesive coating was allowed to dry for about three hours. The adhesive coating was then activated by exposure to infrared heat for 30 seconds to bring the surface temperature to about 165° F. and surfaces of two portions of the coated fabric were pressed together. In a peel pull test at 12" per minute a bond strength of about 12 lbs. per inch of width was obtained.

Example VII

Polypropylene tape was brushed with a 50% solids solution of benzophenone in tetrahydrofuran and allowed to dry. Thereafter, the coated surface of the tape was subjected to radiation for 10 seconds at a distance of 5" from a 1500 watt ultraviolet lamp. After radiation the surface of the radiated coating was brushed with a 70% solids solution of polyarylene polyisocyanate (PAPI) in methyl ethyl ketone, the excess was wiped off and the solution allowed to dry.

The polyisocyanate treated surface was then coated with an adhesive solution of a linear polyester urethane (Estane) in tetrahydrofuran and the coating was allowed to dry for three hours. The coated surface was then subjected to infrared heat for about 30 seconds to bring the surface temperature to about 165° C. and surfaces of two portions of the tape were pressed together.

In a peel pull test at 12" per minute a bond strength of about 10 lbs. per inch of width was obtained.

Example VIII

Dacron fabric coated with a rubbery copolymer of about 98% polyisobutylene and 2% of anisoprene (butyl rubber) was subjected to radiation for one second at a distance of 5" from a 1500 watt ultraviolet lamp.

After radiation the surface of a portion of the radiated coating was brushed with a 1% solids solution of methylene bis (4,4'-phenyl) isocyanate and the surface of another portion was brushed with a 70% solids solution of methyl bis(4-phenyl) isocyanate, the excess being wiped off in each case and the solution allowed to dry.

The polyisocyanate treated surfaces were then coated with an adhesive solution comprising 15% solids in tetrahydrofurane solution of a linear polyurethane obtained by condensation of one mol of polyester (molecular weight about 2000) from polymerization of a lactone with two mols of methyl bis (4-phenyl) isocyanate and was chain extension of the condensate with 1,4 butane diol. The adhesive coatings were allowed to dry. Thereafter the adhesive coatings were brushed with tetrahydrofurane and surfaces of two portions of the adhesive coated fabric were pressed together.

In a peel pull test at 12" per minute, a bond strength of about 15 lbs. per inch width was obtained in each case.

Example IX

A vulcanizable ethylene propylene diene terpolymer resin composition was prepared by milling together the following components.

| Component: | Parts by weight |
|---|---|
| Ethylene propylene diene terpolymer | 100 |
| Zinc oxide | 5 |
| Stearic acid | 1 |
| Carbon black | 405 |
| Aromatic processing oil | 125 |
| Mercaptobenzothiazole | 1.5 |
| Dipentamethylene thiuram tetrasulfide | 0.8 |
| Tetramethylthiuram disulfide | 0.8 |
| Sulfur | 2.5 |
| Tellurium diethyl dithiocarbamate | 1 |
| Benzophenone | 4 |

The milled mixture was cured at 290° F. with 100 lbs. per square inch pressure for 45 minutes.

Sections of cured terpolymer resin were subjected to irradiation with ultraviolet, the lamp being spaced at a distance of three inches from the resin surfaces, for periods as noted in the following table and after irradiation, the irradiated surfaces were wiped with a 70% solution of polyarylene polyisocyanate (PAPI) in methyl ethyl ketone. After wiping, the surfaces were allowed to dry.

The surfaces were then coated with the same adhesive solution used in Example V. After application of the adhesive and drying one hour the adhesive was activated for 30 seconds in a radiant heat activator to bring the surface temperature to about 135° C. and surfaces of pairs of the sections were pressed together for 30 seconds at 200 lbs. pressure. A peel pull test after one day gave the following results.

| Time of radiation, seconds | Peel pull in lbs. per inch | Character of failure |
|---|---|---|
| 3 | 20 | Interfacial. |
| 10 | 34 | Interfacial and stock tearing. |
| 20 | 45 | Stock tearing. |
| 45 | 45 | Do. |
| 60 | 45 | Do. |

Control tests were conducted in which vulcanized ethylene propylene diene terpolymer sections of the same composition but not containing the photosensitizer were radiated, wiped with polyisocyanates, coated with the same adhesive, activated, assembled and tested. The following results were obtained.

| Time of radiation, seconds | Peel pull in lbs. per inch | Character of fai ure |
|---|---|---|
| 3 | 3½ | Interfacial. |
| 20 | 17 | Do. |
| 45 | 20 | Do. |

In a further control, sections of vulcanized ethylene propylene diene terpolymer of the same composition but not containing the photosensitizer were brushed with a 5% by weight solids solution of benzophenone in acetone and then radiated, wiped with polyisocyanate, coated with the same adhesive, activated, assembled and tested. The following results were obtained.

| Time of radiation, seconds | Peel pull in lbs. per inch | Character of failure |
|---|---|---|
| 3 | 40 lbs. | Stock tearing. |
| 20 | 40 lbs. | Do. |
| 45 | Up to 60 lbs. | Do. |

Example X

The following series of bonds was prepared in which strips of polypropylene film were bonded to form lap joints. The surfaces to be bonded of the film strips were given pretreatments as set forth in the accompanying table and were then given an adhesive coating of an adhesive solution of the type employed in Example IV. After application of the adhesive, the coated strips were allowed to dry for 1.5 hours at room temperature and were then activated by heat for 30 seconds at 165° F. The strips were assembled under a pressure of 240 lbs. per square inch.

TABLE

| Surface preparation | Irradiation at 3", secs. | Wipe | Bond strength (p.s.i.) |
|---|---|---|---|
| None | 35 | No | 23 |
| 5% benzophenone in acetone | 35 | No | 160 |
| 10% benzophenone in acetone | 35 | No | 155 |
| 30% benzophenone in acetone | 35 | No | 152 |
| 5% benzophenone in acetone | 35 | Methylene chloride. | 166 |
| 10% benzophenone in acetone | 35 | do | 182 |
| 30% benzophenone in acetone | 35 | do | 202 |

The results show that it is beneficial to remove sensitizer by wiping, most especially when greater amounts of sensitizer are applied.

Having thus described my invention what I claim as new and desire to secure by Letters Patent of the United States is:

1. The process for treating a body of a polymer resin selected from the group consisting of polyvinyl fluoride, polyvinylidene fluoride, polyolefins, copolymers of ethylene and propylene containing a small proportion of a nonconjugated diene and mixtures of these and having a critical surface tension of wetting of not more than 35 dynes per centimeter, to enable the body readily to be wet and bonded by adhesives, said process comprsing the steps of radiating a surface of said body with at least 100 watt seconds per square foot of ultraviolet radiation at a wave length of 2000 to 3500 A. to generate NCO-reactive groups at the surface of said body integrally united with the main body of said resin, and subsequently reacting said NCO-reactive groups with an organic isocyanate having an —NCO functionality of at least 2 to create a surface character readily bondable by adhesive.

2. The process as defined in claim 1 in which said isocyanate is a polyisocyanate having an —NCO functionality of more than two.

3. The process as defined in claim 2 in which said radiation is from about 1000 to about 6000 watt seconds per square foot.

4. The process as defined in claim 2 in which a photosensitizer having a triplet state energy of at least 62 kcal./mole is present at said surface during radiation.

5. The process as defined in claim 4 in which said photosensitizer is normally solid and is supplied to said surface as an at least 2% by weight solution in an inert volatile organic solvent.

6. The process as defined in claim 5 in which said photosensitizer is a solid and in which residual photosensitizer is wiped from the surface of said body after radiation.

7. The process as defined in claim 2 in which the isocyanate treatment includes the step of aplying an organic polyisocyanate to said surface as a solution in an inert volatile organic solvent, the polyisocynate concentrtion of said solution being at least about 10%.

8. The process as defined in claim 4 in which the isocyanate treatment includes the step of applying an organic polyisocyanate to said surface as a solution in an inert volatile organic solvent, the polyisocyanate concentration of said solution being at least about 10%.

9. The process as defined in claim 8 in which said photosensitizer is a solid and in which residual photosensitizer is wiped from the surface of said body of resin after radiation.

10. The process as defined in claim 4 in which the isocyanate treatment includes the step of applying an orgnic polyisocyanate to said surface in solution mixed with an adhesive solution in an invert volatile organic solvent, the polyisocyanate concentration of said solution being at least about 1%.

11. The process as defined in claim 10 in which said adhesive is selected from the group consisting of polyether glycol urethanes, polyester glycol urethanes, resinous polyesters from condensation and polymerization of at least one dibasic organic acid and at least one glycol and resinous polyesters from polymerization of lactones.

12. A polymer resin body having surfaces readily wet and bonded by adhesives prepared by treating such resin polymer bodies according to the process of claim 1.

13. A polymer resin body having surfaces readily wet and bonded by adhesives prepared by treating such hydrocarbon resin polymer bodies according to the process of claim 3.

14. A hydrocarbon polymer resin body having surfaces readily wet and bonded by adhesives prepared by treating such resin polymer bodies according to the process of claim 4.

15. A polymer resin body having surfaces readily wet and bonded by adhesives prepared by treating such resin polymer bodies according to the process of claim 7.

16. A polymer resin body having surfaces readily wet and bonded by adhesives prepared by treating such resin polymer bodies according to the process of claim 9.

References Cited

UNITED STATES PATENTS

| | | | |
|---|---|---|---|
| 3,382,215 | 5/1968 | Baum | 260—77.5 |
| 3,225,119 | 12/1965 | Baker | 260—77.5 |
| 2,964,422 | 12/1960 | Borgstedt et al. | 260—77.5 |
| 2,921,006 | 1/1960 | Schmitz et al. | 204—159.15 |

MURRAY TILLMAN, Primary Examiner

R. B. TURER, Assistant Examiner

U.S. Cl. X.R.

117—138.8; 156—331; 161—188, 189, 190; 204—159.19, 159.2; 260—23.7, 33.6, 41.5, 75, 77.5, 79.5, 859